July 12, 1960  W. M. MALLOY, SR  2,944,516
BIRD FEEDER
Filed June 9, 1958  2 Sheets-Sheet 1
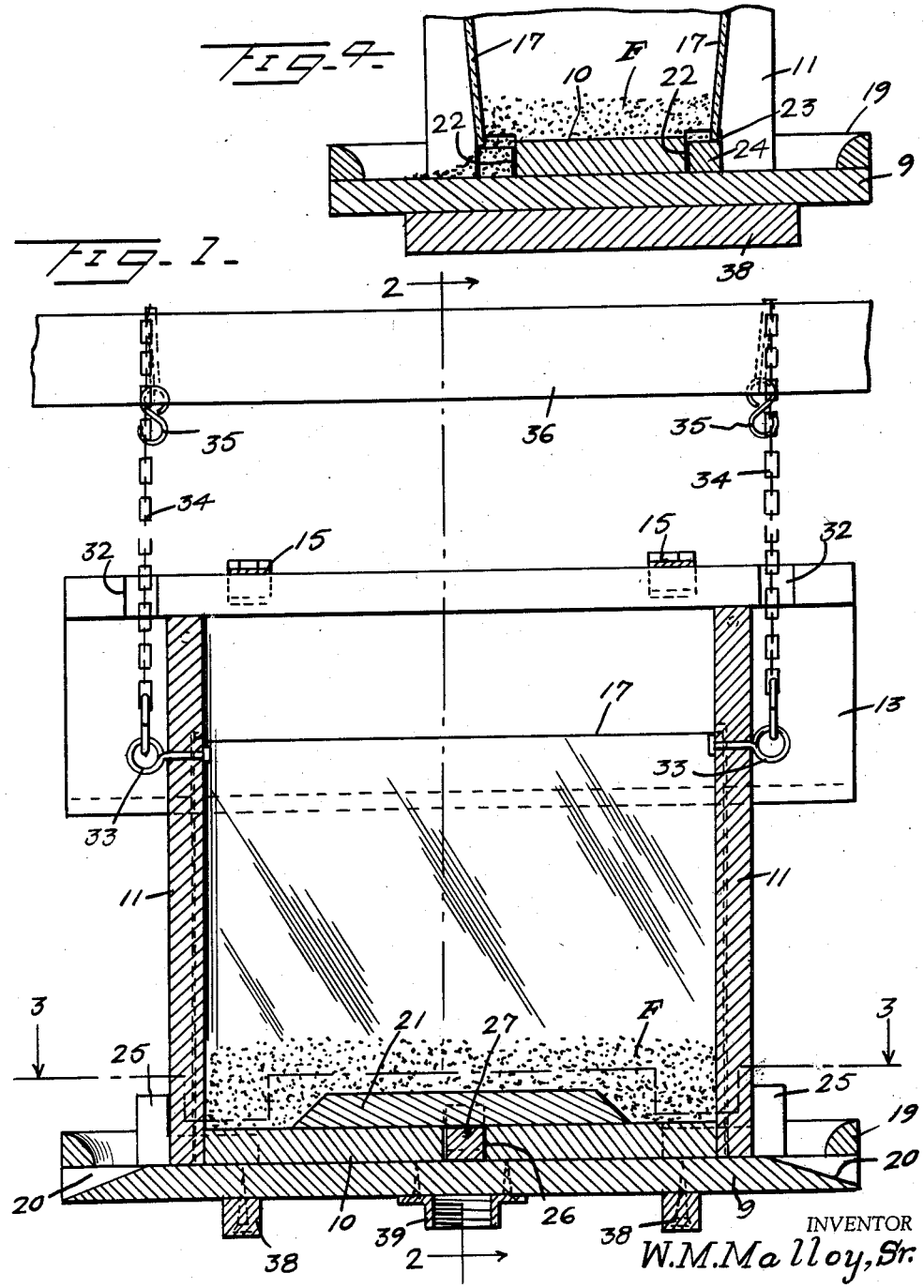
INVENTOR
BY *John N. Randolph*
ATTORNEY July 12, 1960 W. M. MALLOY, SR 2,944,516
BIRD FEEDER
Filed June 9, 1958 2 Sheets-Sheet 2
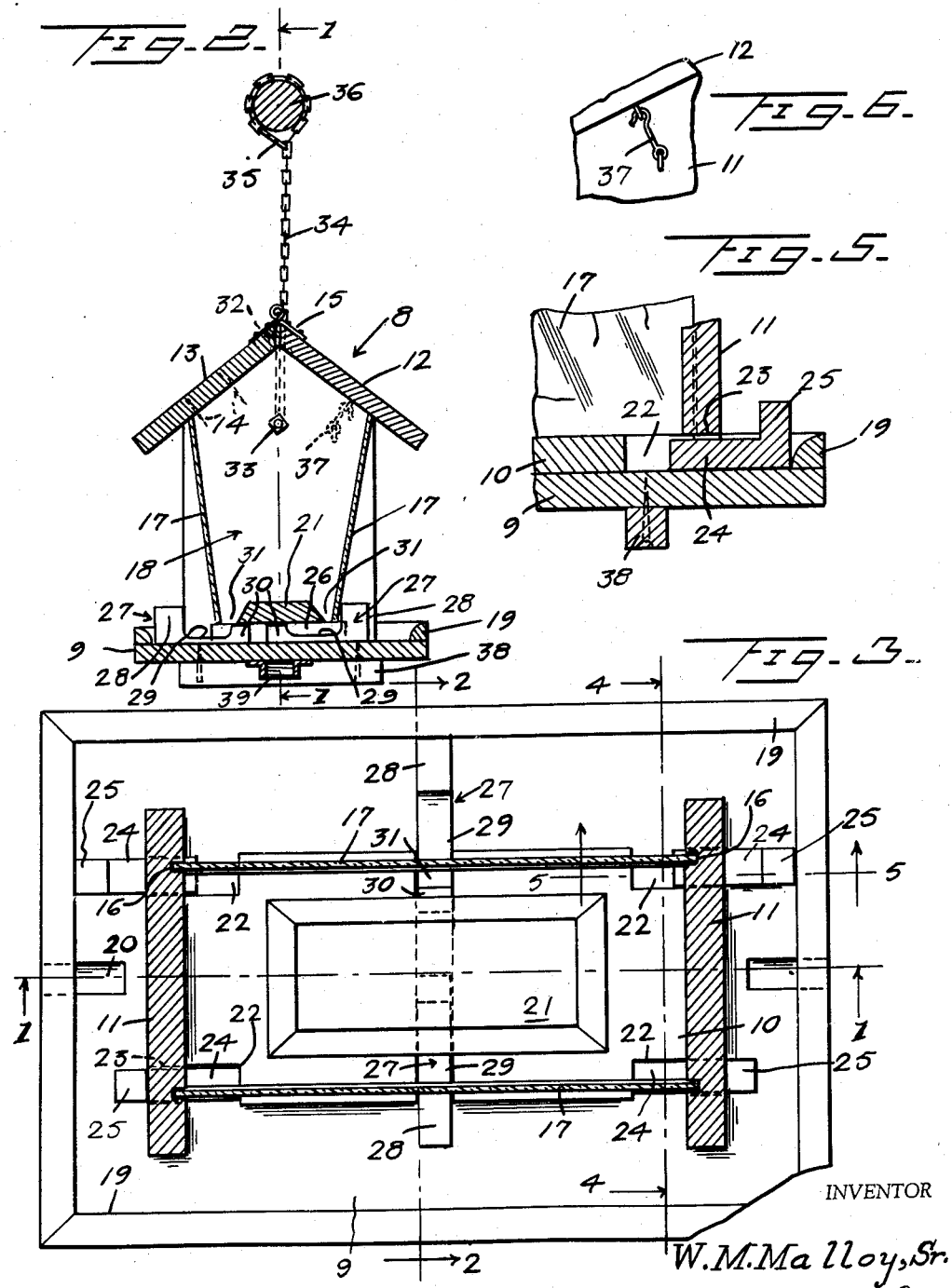
INVENTOR
W. M. Malloy, Sr.
BY John N. Randolph
ATTORNEY

United States Patent Office 2,944,516
Patented July 12, 1960

2,944,516

BIRD FEEDER

William M. Malloy, Sr., Stony Point, N.Y.

Filed June 9, 1958, Ser. No. 740,745

6 Claims. (Cl. 119—52)

This invention relates to a feeder for wild birds and has for its primary object to provide an attractive wild bird feeder for outdoor use which is capable of holding a considerable quantity of bird feed and which is provided with a manually adjustable means for regulating the amount of feed which is discharged from a bin or hopper of the feeder and onto a feeding platform where the discharged feed is available to wild birds, for thus minimizing the amount of feed which is wasted.

Another object of the invention is to provide a wild bird feeder having novel means for protecting the feed stored within the hopper or bin and, to a limited extent, the feed which has been discharged onto the feeding platform, from spoilage due to moisture.

A further object of the invention is to provide a bird feeder capable of being suspended from above and having a roof section which may be opened while the feeder is thus suspended, for refilling the bin or hopper.

Still a further object of the invention is to provide a wild bird feeder of simple construction, which is extremely attractive in appearance and wherein the feed contained within the bin or hopper is visible through transparent walls or panels of the feeder.

Various other objects and advantages of the invention will hereinafter become more fully apparent from the following description of the drawings, illustrating a presently preferred embodiment thereof, and wherein:

Figure 1 is a substantially central vertical sectional view of the feeder taken substantially along the line 1—1 of Figures 2 and 3 and on an enlarged scale relative to Figure 2;

Figure 2 is a cross sectional view of the feeder, taken substantially along the line 2—2 of Figures 1 and 3, and on a reduced scale;

Figure 3 is a horizontal sectional view of the feeder, taken substantially along the line 3—3 of Figure 1, and with a portion of the feeder broken away;

Figure 4 is a fragmentary cross sectional view of the lower portion of the feeder, taken substantially along the line 4—4 of Figure 3;

Figure 5 is a fragmentary longitudinal sectional view taken substantially along the line 5—5 of Figure 3, and Figure 6 is a fragmentary end elevational view of a part of the feeder.

Referring more specifically to the drawings, the wild bird feeder in its entirety is designated generally 8 and includes a rectangular, substantially flat platform 9. An elongated hopper or bin floor 10 is disposed on and secured to the upper side of the platform 9. Said hopper bottom or floor 10 is of substantial thickness so that the upper side thereof is disposed substantially above the level of the upper surface of the platform 9.

Corresponding hopper end walls 11 rest on and rise from the platform 9 and are disposed against the ends of the hopper bottom or floor 10 and are suitably secured to the platform 9 and floor 10. Said end walls 11 have gabled upper ends providing supports for the sections or halves 12 and 13 of a gabled roof of the hopper or bin.

The roof half or section 13 is secured immovably by fastenings 14 to portions of the upper edges of the end walls 11 and the roof section 12 is swingably connected to the roof section 13 by hinges 15 which are disposed over the ridge of the roof. The end walls 11 are each provided with two downwardly and inwardly inclined grooves 16 formed in the inner side thereof. The grooves 16 of the two end walls 11 accommodate transparent panels 17 the ends of which slidably engage in longitudinally aligned grooves of the two end walls, as best seen in Figure 3. As best seen in Figures 2 and 4, the bottom edges of the transparent panels 17 rest upon the hopper bottom or floor 10 and the upper edges thereof are disposed beneath and adjacent portions of the roof sections 12 and 13. Said transparent panels 17 constitute side walls of the hopper or bin, designated generally 18, and which additionally includes the end walls 11, the hopper bottom or floor 10 and the roof sections 12 and 13.

The upper side of the platform 9 along its side edges and ends is provided with a molding 19 all portions of which are spaced outwardly from the end walls 11 and floor 10 of the hopper or bin 18. The end portions of the upper side of the platform 9 are provided with outwardly and downwardly sloping grooves 20, the inner ends of which open upwardly between the end walls 11 and the end portions of the molding 19, and the outer ends of which open outwardly of the ends of the platform 9, beneath the molding 19. Said grooves 20 provide drainage outlets for draining water such as may accumulate from rain or snow from the platform 9, around the hopper or bin 18, and which marginal portions of the platform 9 constitute the feeding area of said platform.

A deflector or baffle member 21 is secured to the upper surface of the hopper floor 10 and terminates in spaced relationship to the end walls 11 and side walls or panels 17 and has downwardly and outwardly sloping side edges and ends, as clearly seen in Figure 3.

The hopper floor or bottom 10 has notches 22 formed in its four corners and above which the end portions of the panels 17 are disposed. As seen in Figures 4 and 5, the end walls 11 have notches in their bottom edges which align with the notches 22 and which combine with portions of the platform 9 to form openings 23. An elongated rectangular valve 24 extends slidably through each opening 23 into the notch 22 which communicates therewith. Each valve 24 has an upstanding handle portion 25 at its outer end which abuts against the outer side of the wall 11 when the valve 24 is in a closed position filling its associated notch 22. The handle 25 can be grasped for pulling the valve 24 outwardly to a partially or fully open position to expose the notch 22 of said valve and so that seed can flow into the notch and outwardly onto the feeding platform 9 beneath the side wall or panel 17, which is disposed over said notch 22. The handle 25 abuts against a part of the molding 19, in a fully open position of the valve 24, so that the molding then functions additionally to prevent removal of the valve 24 from the hopper 18.

The hopper floor 10 is actually composed of two corresponding end sections and having adjacent ends spaced from one another and combining with the deflector 21, which overlies said adjacent ends, to form a transverse bore 26 located intermediate of the ends of the hopper 18 and which opens outwardly of the side edges of the bottom 10, beneath the side walls or panels 17. Said transverse bore 26 slidably receives two corresponding valve members 27 which are disposed in end-to-end relation relative to one another and which have enlarged upstanding outer ends 28 forming handle portions. The upper edges of the valves 27 have recessed intermediate portions 29, disposed between the handles 28 and the inner ends 30 of said valves 27. Said inner ends 30 have relatively snug fitting sliding engagement in the bore 26. When one of the valves 27 is in an open position, as illustrated by the left hand valve 27 of Figure 2, feed from the hopper 18 can flow through the passage 31, by gravity, into the recess 29 of said valve and from said recess onto the feeding area of the platform 9. The passage 31 is located between a part of the bottom edge of the panel 17, which is disposed over an end of the bore 26, and the adjacent side edge portion of the deflector 21, which is spaced from said panel 17. The other, right hand valve 27 of Figure 2 is shown in a closed position so that the outer end of its recess 29 is located within an end of the bore 26, in order that the feed contained in said right hand valve recess 29 cannot escape onto the platform. It will thus be seen that feed from the hopper or bin 18 can be discharged in regulated amounts onto the platform 9 on each side of the hopper and adjacent each end thereof and intermediate of the ends of the hopper. Thus, the feed is dispensed by gravity, regulated as desired, from one or more of the valve controlled outlets.

The normally abutting upper edges of the roof sections 12 and 13 are provided with opposed notches forming openings 32 which are located beyond the end walls 11, as best seen in Figure 1. Eyebolts 33 are anchored in and project outwardly from the end walls 11, beneath said openings 32. Chains 34 are connected to and extend upwardly from the eyebolts 33 through the openings 32 and have hooks 35 at their upper free ends. The upper portions of the chains 34 are adapted to engage over a tree branch or branches or a supporting bar or bars 36 and the hook 35 of each chain is selectively engaged with a link of said chain for forming a loop in said chain through which the support 36 extends. With the feeder 8 thus suspended from above, as illustrated in Figures 1 and 2, the hinged roof half 12 may be swung upwardly to an open position as illustrated in dotted lines in Figure 2 for filling the hopper or bin 18 with feed, as indicated at F in Figures 1 and 4. The hinged roof section 12 is normally retained in a closed position by a hook and eye fastening 37, which connects said roof section to the outer side of one of the end walls 11, as best illustrated in Figure 6.

Transversely disposed cleats 38 are secured to the underside of the platform 9 for supporting the feeder 8 on a supporting surface, in lieu of being suspended from above by the chains 34. An internally threaded socket 39 is secured to the underside of the central portion of the platform 9 and may be threadedly connected to the upper end of a post, not shown, for supporting the feeder 8 thereon, in lieu of said feeder being supported by the chains 34 or cleats 38. The cleats 38 extend to below the level of the socket 39, as seen in Figure 2.

The eave portions of the roof sections 12 and 13 overhang the side edge portions of the platform 9, as seen in Figure 2, and the ends of the roof halves overhang the ends of the platform 9 for substantially shielding said platform portions and the feed contained thereon from moisture due to rain or snow. The upper surface of the hopper floor or bottom 10 is sufficiently elevated relative to the upper surface of the feeder platform 9 so that no moisture will reach the feed F contained within the hopper 18 so that there will be no spoilage of the feed while in the hopper.

Various modifications and changes are contemplated and may be resorted to, without departing from the function or scope of the invention as hereinafter defined by the appended claims.

I claim as my invention:

1. A wild bird feeder comprising a platform, a feed containing hopper fixed to and rising from said platform, said hopper including a bottom having an upper surface disposed substantially above the level of the platform and approximately parallel thereto, said platform having side edge portions and end portions extending outwardly from the hopper bottom, said hopper having at least one recess formed in and opening upwardly through the hopper bottom into the hopper and outwardly of the hopper bottom onto a portion of said platform, and a valve member slidably supported on the platform and engaging said recess and slidably adjustable relative to the hopper for regulating gravity flow of feed from the hopper onto a part of the platform disposed outwardly of the hopper bottom.

2. A wild bird feeder as in claim 1, said hopper having a gabled roof forming the top thereof including a fixed roof section and a movable roof section hingedly connected to said fixed roof section and swingable upwardly to an open position for filling the hopper, said roof extending beyond the ends of the hopper, said roof sections having normally abutting edges provided with notches forming openings disposed beyond the ends of the hopper, and flexible supporting elements secured to the hopper and extending upwardly therefrom through said roof openings and whereby the movable roof section can be swung to an open position while the feeder is suspended from above by said flexible elements.

3. A wild bird feeder as in claim 1, said hopper including upright end walls fixed to and rising from the platform and abutting against the ends of the hopper bottom, said end walls having downwardly and inwardly inclined grooves in adjacent sides thereof, transparent panels extending between said end walls and having end portions engaging in said grooves and forming side walls of the hopper, said panels having bottom edges resting on the hopper bottom, and a gabled roof constituting the top of the hopper and supported by the upper ends of said end walls.

4. A wild bird feeder as in claim 3, said gabled roof having eave portions overlying side edge portions of the platform and end portions overlying end portions of said platform.

5. A wild bird feeder as in claim 1, said platform having a surrounding molding spaced outwardly from the hopper, and drain passages formed in said platform and opening outwardly of edge portions thereof beneath parts of the molding and upwardly through the platform within the molding.

6. A wild bird feeder as in claim 1, and a deflector member mounted on the upper side of the hopper bottom within the hopper for deflecting the feed toward the hopper outlet.

References Cited in the file of this patent

UNITED STATES PATENTS

| | | |
|---|---|---|
| 1,463,863 | Wolf | Aug. 7, 1923 |
| 2,302,314 | Haggart | Nov. 17, 1942 |
| 2,607,318 | Collier et al. | Aug. 19, 1952 |
| 2,673,551 | McAnly | Mar. 30, 1954 |
| 2,707,454 | Wilkenson | May 3, 1955 |
| 2,789,536 | Hawkins | Apr. 23, 1957 |